May 11, 1965     W. A. HYLAND     3,183,046
BEARING SEAL
Filed Oct. 17, 1961
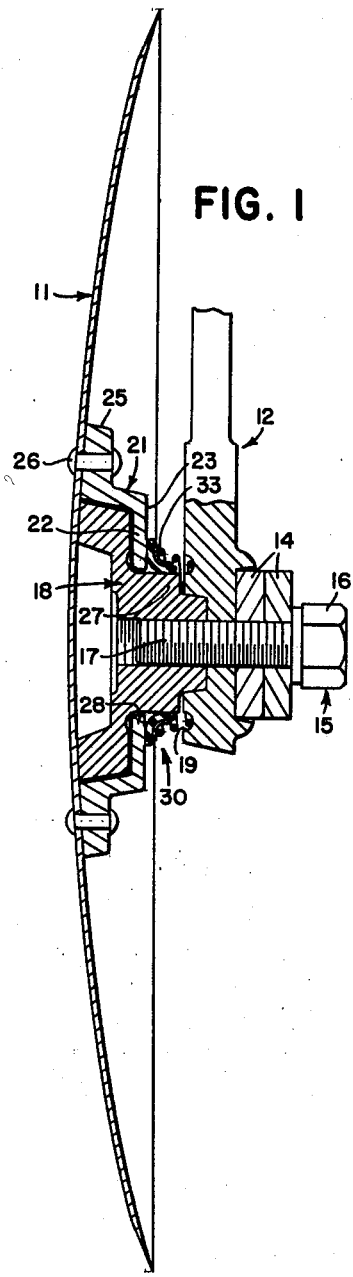
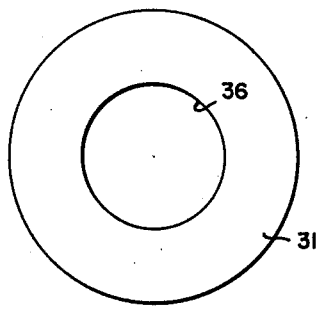
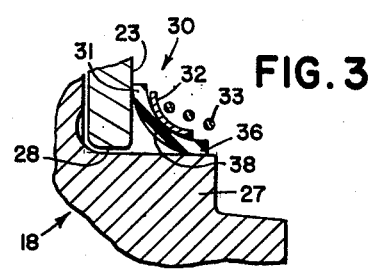
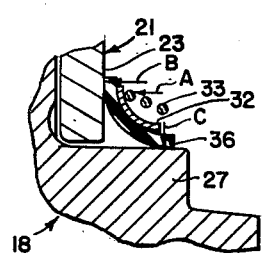
INVENTOR.
WILLIAM A. HYLAND
BY
Roger C. Johnson
ATTORNEY

United States Patent Office 3,183,046
Patented May 11, 1965

3,183,046
BEARING SEAL
William A. Hyland, Horicon, Wis., assignor to Deere & Company, Moline, Ill., a corporation of Delaware
Filed Oct. 17, 1961, Ser. No. 145,699
1 Claim. (Cl. 308—19)

This invention relates generally to agriculture implements and more particularly to seals and the like for excluding dust, dirt, grit, and other objectional material from bearings, particularly bearings for disk-type furrow openers.

The object and general purpose of this invention is the provision of a simple and effective seal for the bearing of a disk furrow opener, in which the seal comprises a normally flat rubber-type disk having a central opening, the internal diameter of which is slightly smaller than the hub of the associated part receiving the seal member. By virtue of this construction when mounted in place the seal member takes a cupped or generally conical form, the cross section of which is curved, with one edge grippingly engaging the hub of the associated stationary member and the other edge engaging substantially flat against the adjacent portion of the rotatable member. Further, the seal includes means for applying generally axially directed pressure against the curved seal member so as to prevent dirt, dust and the like from working under the seal at any point.

These and other objects and advantages of this invention will be apparent to those skilled in the art after a consideration of the following detailed description, taken in conjunction with the accompanying drawings, in which:

FIG. 1 is a generally central vertical section taken through a disk furrow opener and associated bearing means therefor, forming a part of a grain drill.

FIG. 2 is a view of a sealing member in its unstressed state before it is applied to the disk bearing.

FIG. 3 is an enlarged sectional view showing the relation between the section curvatures of the sealing member and the rigid pressure-applying member before pressure is applied to the latter to urge the edge portions of the sealing member in contact both with the relatively stationary hub and with the adjacent portion of the associated rotatable member of the furrow opener.

FIG. 4 is a view similar to FIG. 3 showing the positions of the parts when the associated spring applies axially directed pressure against the back-up ring.

Referring first to FIG. 1, which shows a single-disk type of furrow opener in which the principles of this invention have been incorporated, the furrow opening disk is indicated by the reference numeral 11 and is per se of generally conventional construction. The disk is rotatably supported by a seed boot casting 12 having its lower end shaped to receive the rear portions 14 of a pair of drag bars that form a portion of the grain drill frame. The lower portion of the seed boot casting 12 and the bars 14 are apertured to receive an attaching member in the form of a cap screw 15 with the head 16 thereof butting against the outer face of the associated drag bar and its threaded end 17 screwed into a bearing member 18. When the cap screw 15 is tightened, the bearing member 18, the boot casting 12, and the drag bars 14 are rigidly fastened together. The face of the boot casting 12 adjacent the bearing member 18 is provided with an annular groove 19.

Secured to the inner face of the disk 11 is a bearing cap 21 shaped to receive and be rotatably supported on the outer portion of the bearing member 18. The bearing cap 21 includes a radially inner flange 22 that is provided with a flat outer planar face 23. The bearing member 21 includes an apertured flange 25 that is rigidly fixed, as by rivets 26, to the disk 11. The bearing member 18 includes a hub section 27 that extends outwardly through the opening 28 in the bearing cap flange 22.

This invention is directed primarily to the provision of new and improved sealing means acting between the face 23 of the bearing member 18 and adjacent portion of the hub 27, and such sealing means will now be described.

The sealing means of this invention indicated in its entirety by the reference numeral 30 includes three members 31, 32 and 33. The member 31 consists of a flat normally planar washer or disk formed of a flexible rubber-like material and, when unstressed, lies flat, as shown in FIG. 2. This member has a central opening 36 that has an internal diameter somewhat less than the diameter of the hub section 27 so that when the sealing washer 31 is forced over the hub section 27 and against the face 23 of the bearing cap, as shown in FIGS. 3 and 4, the member 31 is curved in section, with the outer edge portion engaging the face 23 and the inner edge portion gripping or engaging the exterior portion of the hub 27. Attempts have been made to use a member of this kind as the sole sealing means between a stationary bearing member and a rotatable member, such as the bearing cap 21, but it has been found that dirt, dust or the like works its way past the edges of the seal and enters between the seal and the disk furrow opener, whereby the latter tends to slide rather than roll.

According to this invention, I provide additional means in the form of a rigid ring, shown at 32, as mentioned above, and an associated spring member 33, so constructed and arranged as to apply generally axial pressure against the sealing washer 31. As will be seen from FIGS. 3 and 4, the rigid ring 32, preferably formed of metal or the like, is curved in section and has a radius of curvature that, before the spring 33 applies axial pressure to the ring 32, is appreciably less than the radius of curvature of the section of the sealing member 31 (FIG. 3). The spring 33 has one end seated in the groove 19, mentioned above, and the other end normally bearing against the rigid ring 32 (FIG. 4).

The diameter of the rigid ring 32 and its configuration are such that when the rigid member is initially brought into contact with the sealing member 31 (FIG. 3), line contact is established, as at 38, with the rubber-like sealing member 31 approximately midway between the edge portions thereof. Then, when the cap screw 15 is tightened and the spring 33 begins to exert its pressure, the rigid ring 32 is pushed axially against the sealing member, as indicated by the arrow A, so that there are components of this force, indicated by the arrows B and C, that act to resiliently or yieldingly hold the inner and outer edges of the sealing member against the face 23 and hub 27. Thus, the inner and outer edges of the member 31 are held against the associated face 23 and hub 27 so that even though soil may be thrown against the bearing during operation, all dirt, dust and the like are effectively excluded from the bearing.

While I have shown and described above the preferred structure in which the principles of the present invention have been incorporated, it is to be understood that my invention is not to be limited to the particular details, shown and described above, but, in fact, widely different means may be employed in the practice of the broader aspects of my invention.

What I claim, therefore, and desire to secure by Letters Patent is:

A disk furrow opener bearing seal assembly comprising: a disk furrow opener, vertically extending supporting means, a relatively stationary bearing carried by said supporting means and having a generally axially extending cylindrical hub and a generally radially outwardly extending bearing section, a bearing cap fixed to said disk and embracing said radially outwardly extending bearing section and including a substantially planar outer face substantially parallel to said bearing section and encircling said cylindrical hub, an apertured rubber-like member having a flat planar disk-like configuration in its unstressed state, said member being at least partially elastically stressed about said cylindrical hub and having the radially inner edge about the aperture grippingly engaging the cylindrical outer surface of said hub, one of the radially outer side portions of the member being substantially normal to the cylindrical hub and abutting the outer planar side of said bearing cap, a rigid ring convexo-concave in section, the convex side of the ring lying in nested relation against the other side of said rubber-like member, and spring means disposed about said cylindrical hub and bearing at one end against said supporting means and at the other end against the concave surface of said rigid ring in an axial direction to urge said outer side portion of the rubber-like member against said planar side and to urge the inner edge portion of said rubber-like member against the cylindrical outer surface of the hub.

References Cited by the Examiner
UNITED STATES PATENTS

| | | | |
|---|---|---|---|
| 1,057,656 | 4/13 | Miller et al. | 308—36.2 |
| 1,914,759 | 6/33 | Schwitzer | 308—36.2 |
| 2,091,486 | 8/37 | Paluck | 308—19 |
| 2,363,420 | 11/44 | Howard | 308—36.2 X |
| 2,603,541 | 7/52 | Kriegbaum | 308—36.2 |

FOREIGN PATENTS

| | | |
|---|---|---|
| 451,994 | 8/36 | Great Britain. |

ROBERT C. RIORDON, *Primary Examiner.*

FRANK SUSKO, *Examiner.*